United States Patent [19]

Toman

[11] E Re. 28,762

[45] **Reissued *Apr. 6, 1976**

[54] RADIO NAVIGATIONAL AID WITH SEPARATE STANDARD FREQUENCY SIGNAL

[75] Inventor: Donald J. Toman, Pleasantville, N.Y.

[73] Assignee: Tull Aviation Corporation, Armonk, N.Y.

[ * ] Notice: The portion of the term of this patent subsequent to Feb. 6, 1990, has been disclaimed.

[22] Filed: Oct. 24, 1974

[21] Appl. No.: 517,845

Related U.S. Patent Documents

Reissue of:

[64] Patent No.: 3,806,935
Issued: Apr. 23, 1974
Appl. No.: 299,586
Filed: Oct. 20, 1972

U.S. Applications:

[63] Continuation-in-part of Ser. No. 54,510, July 13, 1970, Pat. No. 3,715,757.

[52] U.S. Cl. ..... 343/108 M; 343/109

[51] Int. Cl.[2] ..... G01S 1/16

[58] Field of Search..... 343/108 M, 109; 325/419, 325/421, 392

[56] References Cited

UNITED STATES PATENTS

| | | | |
|---|---|---|---|
| 1,476,721 | 12/1923 | Martin | 325/419 |
| 2,113,260 | 4/1938 | Usselman | 325/416 |
| 2,602,161 | 7/1952 | Proskauer | 343/107 |
| 3,487,411 | 12/1969 | Toman | 343/109 |
| 3,735,407 | 5/1973 | Meyer | 343/108 M |

*Primary Examiner*—T. H. Tubbesing
*Assistant Examiner*—Richard E. Berger
*Attorney, Agent, or Firm*—Curtis Ailes

[57] ABSTRACT

Radio guidance signals comprising a carrier having modulation patterns defining a predetermined guidance path plane for a craft to be guided are transmitted, preferably in a scanning beam, from a ground station. A separate standard frequency signal is also transmitted from the ground station which has a predetermined difference in frequency from the guidance signal carrier frequency, the standard frequency being employed to control a local oscillator at the receiver.

19 Claims, 5 Drawing Figures

RADIO NAVIGATIONAL AID WITH SEPARATE STANDARD FREQUENCY SIGNAL

Matter enclosed in heavy brackets [ ] appears in the original patent but forms no part of this reissue specification; matter printed in italics indicates the additions made by reissue.

This application is a contination-in-part of the prior U.S. patent application Ser. No. 54,510 filed July 13, 1970 now U.S. Pat. No. 3,715,757 issued Feb. 6, 1973, for a RADIO GUIDANCE SYSTEM WITH SEPARATE TRANSMISSION OF A STANDARD FREQUENCY SIGNAL TO ENHANCE THE DISCRIMINATION OF THE RECEIVER.

This invention relates to guidance systems, and to guidance systems which are particularly useful for aircraft and which may be operated at microwave frequencies. The systems of the present invention are particularly useful for the guidance of aircraft in descent towards an airport for landing. Accordingly, the invention is described in terms of this function. However, it will be understood that the invention is also very useful in systems providing other guidance functions for aircraft, land craft, or water craft.

Present aircraft instrument landing systems, sometimes referred to as ILS, are operable at very high frequencies (VHF) frequencies. These present systems represent a large existing investment in airport ground installations and also in aircraft equipment installations. However, at the VHF frequencies, there are many airport sites where the conventional ILS simply cannot be operated successfully because of the problems of reflections of signals which make the transmitter signals ambiguous and unusable to the aircraft. Furthermore, the VHF systems are very expensive, which further limits the number of installations, and prevents installation at many airports where they are needed.

Accordingly, it is one object of the present invention to provide an improved low-cost microwave aircraft guidance system which can be effectively used at otherwise difficult airports sites.

In carrying out the present invention, guidance function signals may be transmitted at microwave frequencies and converted in the receiver by a direct subtraction conversion to obtain signals at intermediate frequencies. In order to accomplish this purpose, it is necessary to provide for a local oscillator in the receiver which is extremely accurate, and therefore likely to be expensive.

Accordingly, it is another object of the present invention to provide a guidance system having improved means for automatically matching the receiver oscillator frequency to the transmitter frequencies.

In carrying out systems of the above type, it has been found to be very advantageous to radiate the radio navigation signals in the form of scanning beams, and preferably in the form of switched scanning beams. A system of that kind forms a portion of the subject matter described and claimed in a copending patent application Ser. No. 104,668 filed Jan. 7, 1971 by Donald J. Toman and Lloyd J. Perper now Pat. No. 3,774,214 issued Nov. 20, 1973 for a SCANNING BEAM GUIDANCE METHOD AND SYSTEM, and assigned to the same asignee as the present application. It has been found to be particularly advantageous to employ separate standard frequency signals for controlling a receiver local oscillator when the navigation signals are being transmitted in a scanning beam.

Accordingly, it is another object of the present invention to provide a radio guidance method involving the transmission of navigation signals by a scanning beam, and including the transmission of a standard frequency signal providing substantially uniform radiation over the entire sector covered by the scanning beam.

Other objects and advantages of the invention will be apparent from the following description and the accompanying drawings.

In carrying out the invention there is provided an improved guidance method for a craft to be guided including the steps of transmitting radio guidance signals from a ground station comprising a carrier having modulation patterns defining a predetermined guidance path plane for a craft to be guided, transmitting a separate standard frequency signal from the ground station having a predetermined difference in frequency from the guidance signal carrier frequency, and employing the standard frequency to control the local oscillator within a receiver in the craft to be guided to improve the discrimination function of the receiver in discriminating the desired guidance signals from other signals.

Figure 5:
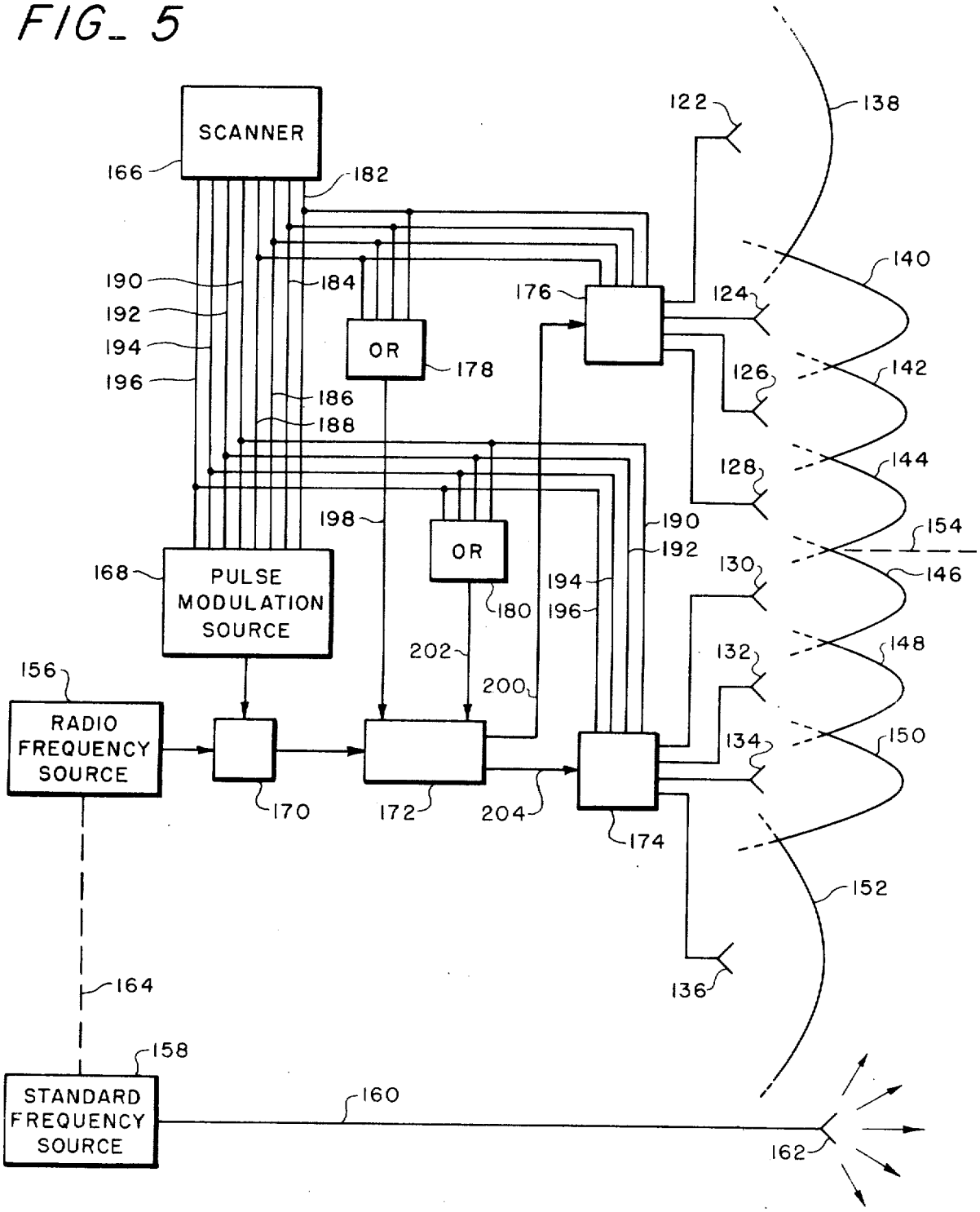

And FIG. 5 is a schematic circuit diagram of a ground station transmitter to be used in carrying out one form of the invention.

In the specification, reference is made to airport ground stations. However, since the invention is usable for guidance functions for aircraft, for purposes other than for landing, and since the invention is usable also for water craft and land craft, it will be understood that the ground stations are not necssarily located at airports.

Figure 1:
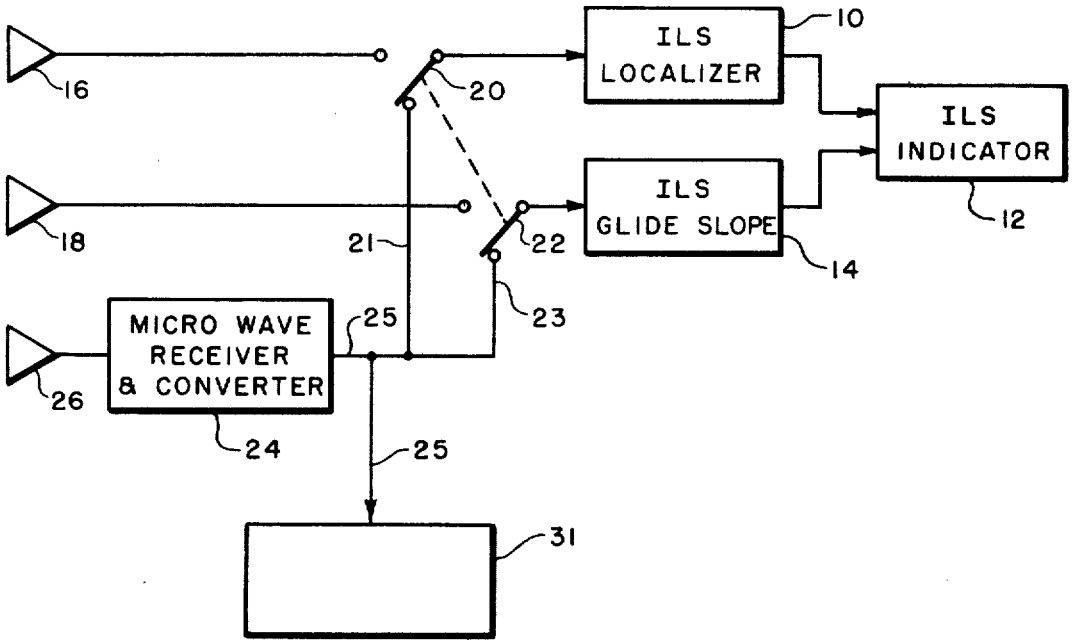
FIG. 1 is a schematic circuit diagram showing the arrangement of a receiver system for installation in an aircraft for carrying out the present invention.

Referring more particularly to FIG. 1, a preferred system in accordance with the present invention is illustrated to include as ILS localizer receiver 10 and an ILS glide slope receiver 14. Both of these receivers feed signals to an ILS indicator 12. The localizer receiver 10 is operable in the normal VHF localizer frequencies in the band from 108 to 112 MHz. Such signals may be received from a localizer antenna 16 through a switch schematically shown at 20. The glide slope receiver is operable to receiver signals at the usual glide slope frequency band from 328.6 to 335.4 MHz. Such signals may be received from a glide slope antenna 18 through a switch element schematically shown at 22 and operable together with the switch element 20. With the exception of the switch elements 20 and 22, the components of the system thus far described may be conventional ILS components.

In accordance with the present invention, a microwave receiver and converter 24 is provided and connected to receive microwave ILS signals through a microwave antenna 26. The microwave signals include signals which are *in* conventional ILS format and they are converted within the receiver-converter 24 to signals which fall within the conventional glide slope and localizer frequency bands. Thus, these signals can be supplied directly to the localizer and glide slope receivers 10 and 14 through connections 21 and 23 and the switches 20 and 22. Signals within the same microwave frequency band may also be received and converted by the receiver 24 and supplied through connection 25 to another navigational aid apparatus 31. Apparatus 31 may comprise a system which is a complete substitute for the localizer 10-glide slope 14 system and which provides more sophisticated navigational or landing aids. On the other hand, the apparatus 31 may simply suppplement the information available from the localizer and glide slope receivers 10 and 14. For instance, the apparatus 31 may be a distance measuring equipment and may employ a portion of the microwave frequency band received by receiver 24 which is not required for the ILS localizer and glide slope functions. The terms "guidance" and "guidance system" are used in this specification to refer to all radio frequency systems by which information is transmitted and received which is useful in the guidance of a craft. This includes all of the functions described above, as well as other similar functions. At least some of these functions are also referred to from time to time as navigation functions, and the systems as navigation systems.

Certain bands of microwave frequencies have been set aside and allocated for guidance functions. These include the C band from 5,000 to 5,250 MHz, and the Ku band from 15,400 to 15,700 MHz. The preferred embodiment of this invention is described in this specification in terms of operation in the C band. However, it will be understood that the invention may be employed also for operations at Ku band, or at some other microwave frequency which may be available for this purpose. Both the C band and the Ku band are each wide enough to encompass a range of frequencies having an absolute difference between the lowest and highest frequency within the band which exceeds the difference between the lowest frequency in the conventional localizer band and the highest frequency in the conventional glide slope band. Thus, a simple conversion by a simple frequency subtraction in the C band receiver and converter 24 is sufficient to convert the C band localizer and glide slope signals to the appropriate respective frequencies for use in the localizer and glide slope receivers 10 and 14. This statement is true only if the localizer and the glide slope signals are transmitted within appropriate matched sub-bands within the microwave band received by the receiver 24. Appropriate sub-bands for this purpose are illustrated for instance in FIG. 2 at 30 and 32.

The localizer signals may be transmitted in the sub-band 30 from 5,000.3 to 5,004.1 MHz, and the glide slope signals may be transmitted in the complementary sub-band 32 from 5,221.5 to 5,227.2 MHz. These frequency limits for the sub-bands 30 and 32 are shown above the representation of the bands in FIG. 2. The frequency conversion within the receiver 24 consists of a simple subtraction of 4,892.2 MHz, resulting in a converted sub-band 30 in the range from 108.1 to 111.9 MHz, and a converted sub-band 32 in the range from 328.7 to 335.3 MHz. These frequency bands correspond to the conventional bands for the localizer and glide slope functions.

Figure 2:
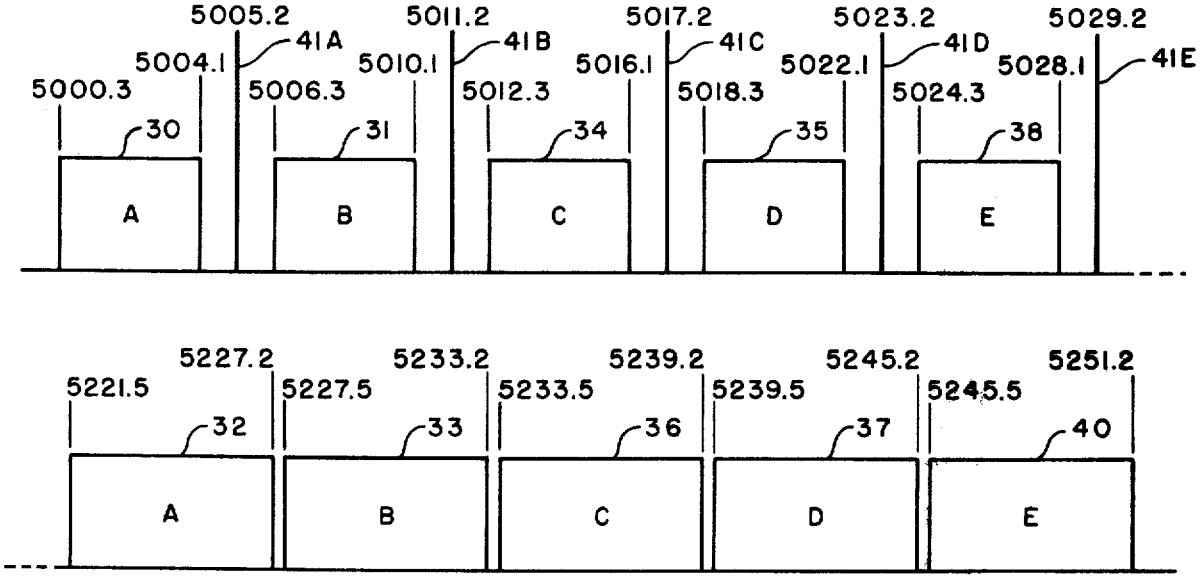
FIG. 2 is a chart illustrating a particular allocation of frequencies which may be employed in carrying out the principles of the invention.

The receiver and converter 24 of FIG. 1 preferably provides also for the employment of other paired sub-bands by subtracting different frequencies from the C band signals. Thus, as illustrated in FIG. 2 at 31, localizer signals may be transmitted in the sub-band from 5,006.3 to 5,010.1 MHz, and by subtracting 4,898.2 MHz from these signals in receiver 24 they are converted to the conventional localizer frequency band from 108.1 to 111.9 MHz. A paired sub-band for transmission of glide slope signals is shown at 33 in the range from 5,227.5 to [5,223.2] *5,233.2* MHz. The same subtraction results in conversion of these signals to the conventional glide slope signal band from 328.7 to 335.3 MHz. Thus, sub-bands 31 and 33 are complementary sub-bands corresponding to the complementary sub-bands 30 and 32, but respectively displaced upwardly by 6 MHz in frequency. Similarly, additional complementary sub-bands respectively displaced upwardly by 6 MHz are provided as illustrated in FIG. 2 at 34, 36, at 35, 37, and at 38, 40. These pairs of sub-bands are respectively designated by the letters A through E. With this frequency allocation, in the highest frequency sub-band 40, the nominal limit is beyond the 5,250 MHz upper limit of the portion of the C band which is allocated to navigational aid functions. Accordingly, no assignments are made for several channels near the top of the frequency range of the glide slope function for that particular sub-band 40.

As illustrated in FIG. 2, it is proposed to provide a total of five pairs of complementary microwave sub-bands. Since 39 pairs of channels may be selected by the conventional localizer and glide slope receivers 10 and 14 from each pair of sub-bands, this system will provide 195 new ILS channels in microwave frequencies in addition to the 39 ILS channels already available at the conventional transmission frequencies. However, the total of 195 is reduced by several channels omitted at the top of the upper pair of sub-bands as mentioned above.

In accordance with the present invention, a standard frequency reference signal is transmitted by the ground station transmitter along with the information signals. This frequency standard signal is employed to automatically control the frequency of the local crystal oscillator in the microwave receiver and converter 24. A different frequency standard signal is transmitted for each pair of complementary sub-channels illustrated in FIG. 2. In accordance with the present invention, these separate standard frequencies are selected to fall between the respective localizer sub-bands. Thus, as illustrated in FIG. 2, there is a frequency standard signal represented at 41A, at the assigned frequency of 5,005.2 MHz, which is exactly midway between the highest frequency of the sub-band 30 and the lowest frequency of the sub-band 31. This standard reference frequency at 41A serves the complementary sub-bands A designated as 30 and 32. Similarly, the standard reference frequencies indicated at 41B, 41C, 41D, and 41E respectively serve the complementary pairs of sub-bands indicated by the letters B, C, D, and E. The frequency difference between each standard reference frequency and the frequencies within the sub-bands served by that standard reference frequency is the same for all of the paired standard frequencies and sub-bands. For instance, it is always 4.9 MHz from the reference standard frequency to the lowest frequency within the localizer sub-band served by that standard frequency. This [proivdes] *provides* very important advantages in simplifying the construction of the aircraft receiver which receives and processess the microwave frequency signals. This will be more apparent from the following description of the receiver.

It is quite apparent that the frequency allocations suggested by FIG. 2 for the ILS functions leave quite a bit of the C band (from 5,030.3 to 5,221.5 MHz) substantially unused. Accordingly, it is contemplated that the additional apparatus 31 supplied through connection 25 may employ these otherwise unused portions of the C band for other guidance signal functions such as for distance measurement equipment.

Figure 3:
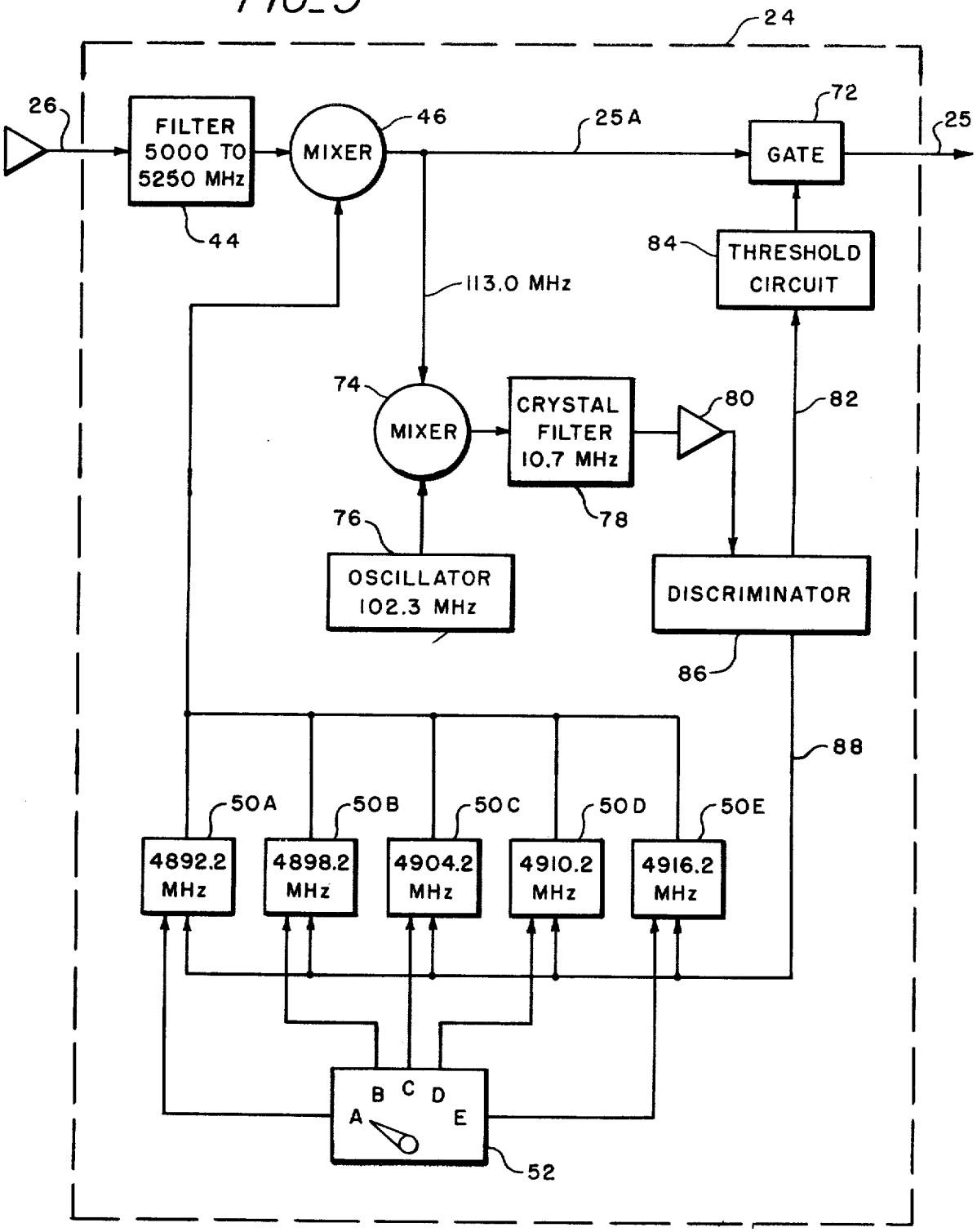
FIG. 3 is a more detailed schematic circuit diagram illustrating preferred features of the microwave receiver and converter which may be employed in the system of FIG. 1.

FIG. 3 is a schematic diagram showing more details of the receiver and converter 24. The receiver 24 is shown to include a filter 44 to limit the input signal to the C band from 5,000 to 5,250 MHz, and a mixer 46 in which the signal is mixed with the output from a selected one of the oscillators 50A–50E to obtain difference frequencies on the intermediate output at 25A. While all five of the local oscillators 50A–50E are connected in circuit with the mixer 46, only one of these local oscillators is operable at any one time. The oscillator selected is dependent upon which of the pairs of sub-bands illustrated in FIG. 2 is to be selected. A selector switch 52 is provided for manually selecting and enabling one of the local oscillators 50A–50E. Thus, if the sub-band pair C is to be selected, the manual switch 52 is set for C, and only the oscillator 50C is enabled. The nominal operating frequency of each of the oscillators 50A–50E is specified in the drawing based upon the frequency allocations indicated in FIG. 2.

Each of the oscillators 50A–50E is automatically controlled by means of the standard reference frequency signal received from the ground station transmitter. A gate circuit 72 is provided to prevent the transmission of ILS signals to connection 25 and to the localizer and glide slope equipments 10 and 14 (FIG. 1) unless a frequency standard signal of acceptable amplitude is being received and detected. The standard frequency signal is converted in the mixer 46, along with the ILS information signals, by subtraction of the output of the selected oscillator 50A–50E. For instance, referring to the frequecny allocations illustrated in FIG. 2, is sub-bands C are selected, the standard frequency shown at 41C at 5,017.2 MHz is used. The frequency of oscillator 50C, 4,904.2 MHz is subtracted from the standard frequency, yielding a difference frequency signal of 113.0 MHz derived from the standard frequency signal at connection 25A. That signal is supplied to a mixer 74 where a frequency of 102.3 MHz supplied from an oscillator 76 is subtracted. The resultant difference signal of 10.7 MHz, is filtered by a crystal filter 78 and amplified by an amplifier 80. The crystal filter 78 may be similar to a standard frequency modulation broadcast intermediate frequency filter, and the amplifier 80 may correspond to a standard frequency modulation broadcast receiver intermediate frequency amplifier. The output of amplifier 80 is supplied to a frequency discriminator and average filter 86 which supplies a direct current output at connection 88 to control the operation of the oscillators 50A–50E. Thus, if the signal received by discriminator 86 is slightly above 10.7 MHz, a DC signal will be produced on connection 88 to control the selected oscillator 50C to slightly increase the frequency of that oscillator to thereby reduce the difference frequencies at the output of the mixer 46. On the other hand, if the signal received by the discriminator 86 is below 10.7 MHz, the DC control signal at connection 88 will be of the opposite polarity to decrease the frequency of oscillator 50C to thereby increase the difference frequencies produced at the output of mixer 46. Thus, the frequency of the converter within the microwave receiver is automatically controlled by a frequency standard signal from the transmitter. And thus the matching of the local receiver oscillator 50 to each transmitter is assured, without the necessity for the additional expense required in providing an extremely accurate local oscillator and in adjusting the local oscillator from time to time to compensate for changes due to aging and other causes such as physical vibrations and mechanical shock. The receiver, or the receiver local oscillator, may be said to be "locked," in a frequency control loop, to the frequency standard signal from the transmitter.

As described more fully below in connection with FIG. 4, the discriminator 86 preferably includes a phase lock circuit which controls the local oscillators 50A–50E to maintain a fixed phase difference between the phase of the 10.7 MHz signals derived from the ground station frequency standard signal and a local 10.7 MHz oscillator within the discriminator 86. Thus, there is a positive phase lock and an absolute frequency lock of the selected one of the local receiver oscillators 50A–50E and the standard reference frequency from the ground station. When the phase and frequency lock condition exists, the discriminator 86 issues a signal on connection 82 to the threshold circuit 84 causing the opening of the gate 72 to permit the navigation information signals to be transmitted on through to the output connection 25.

Since all ground stations using the same pair of sub-bands will radiate the same reference frequency, the receiver need not be turned or adjusted as it approaches an airport, other than to select the proper pair of sub-bands by operation of switch 52. Furthermore, as the aircraft approaches the desired airport, the reference signal from the ground station at that desired airport will predominate and capture and control the local oscillator. This will be true even though another ground station transmitting the same reference frequency may be within receiving range because the system, as shown and described above, opeprates will the well known frequency modulation limiting effect such that the discriminator will recognize the strongest signal to the exclusion of all other signals at or near the frequency of the local reference signal.

Another advantage of employing a reference frequency signal from the ground station to control the receiver is that it substantially eliminates the tuning error resulting from Doppler frequency shift on the transmitted microwave signals experienced at the aircraft because of its approach to the transmitter. This frequency shift can be substantial, reaching about 1 kilohertz for a typical approach to a C band transmitter. The reduction in the tuning error occuring from the Doppler effect results from the fact that the frequency of the reference signal and the frequency of the information signal are nearly equal and therefore experience nearly the same Doppler frequency shift. Since the position of the information signal in the correct channel depends primarily on the accuracy of the frequency difference between the reference signal and the information signals and this frequency difference is quite small in comparison with either the reference signal frequency or the information signal frequency, the Doppler frequency shifts are effectively cancelled.

The frequency control of the receiver by a fixed frequency standard reference signal from the ground station, as described just above, not only permits a cost reduction in the receiver, but it also can permit the use of relaxed frequency specifications on the ground station. This results from the previously described effect that the tuning accuracy is primarily dependent on the accuracy of the frequency difference between the reference signal and the information signals.

The receiver frequency control system of the present invention is also particularly advantageous because it does not require a broad band frequency search, the automatic frequency control loop of the receiver always expects a signal in its own particular narrow band. The oscillators 50A–50E, while automatically adjustable in frequency, are always operable within a frequency range which is narrow enough to be within the discrimination range of the discriminator 86. Furthermore, no connections are required to the ILS receivers 10 and 14 of FIG. 1 other than the antenna input connections at switches 20 and 22. By employing a standard frequency signal, which is not modulated or used for information transmission of any other kind, it is possible to use an extremely narrow band width signal, essentially a pure single frequency signal which thereby provides an optimum in signal-to-noise discrimination on the basis of frequency.

Figure 4:
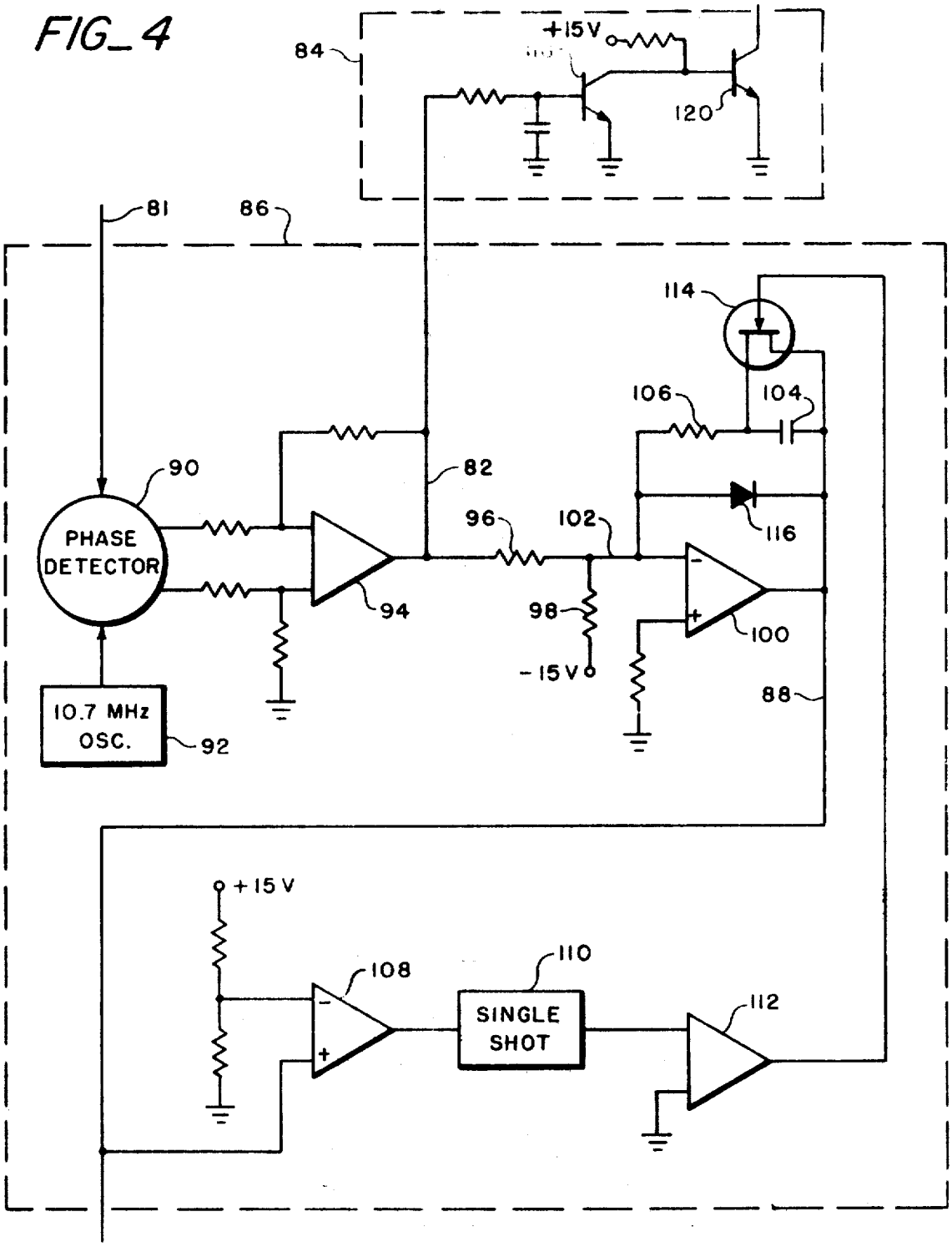
FIG. 4 is a schematic circuit diagram showing details of the discriminator and threshold circuit which form parts of the receiver of FIG. 3.

FIG. 4 illustrates details of the discriminator 86 and the threshold circuit 84 of the microwave receiver and converter 24 of FIG. 3. The 10.7 MHz signal from the filter 78 and the amplifier 80 (FIG. 3), when available, is supplied to the discriminator 86 at the connection 81. From connection 81, the signal is fed to a mixer 90 (FIG. 4) where its phase is compared to the phase of a 10.7 MHz signal from an oscillator 92. The phase difference is detected by an operational amplifier 94 which is connected to the mixer 90 for this purpose. The output of the operational amplifier 94, at 82, is at a direct current voltage level which is a function of the difference in phase between the 10.7 MHz input at 81, and the 10.7 MHz input from oscillator 92.

The entire discriminator circuit 86 operates to control the frequency of the selected one of the local oscillators 50A–50E (of FIG. 3) so as to maintain the phse difference of the input 10.7 MHz wave at 81 and the 10.7 MHz wave from oscillator 92 at a fixed phase difference corresponding to a predetermined direct current voltage value at connection 82. This is accomplished by means of a voltage dividing network consisting of resistors 96 and 98 feeding the input to an operational amplifier 100, connected to operate as an integrator, the output of which is on connection 88 and provides the control voltage to the local oscillators 50A–50E (FIG. 3). An operating example of circuit constants is as follows: If the phase difference voltage to be maintained at connection 82 is 1.5 volts, and a supply voltage of minus 15 volts is applied as shown at the bottom end of resistor 98, the ratio of the resistance values of resistors 96 and 98 may to one to 10. This combination of constant provides a zero DC input voltage at the input connection 102 to the integrator operational amplifier 100. Under these conditions, the output of the amplifier 100 does not change and the resultant control voltage on connection 88 does not change for the local [ocillator] *oscillator.* However, if there is a frequency drift such that the phase of the 10.7 MHz wave from the input connection 81 shifts with respect to the wave from the oscillator 92, the DC level at the output 82 of amplifier 94 changes slightly, causing a change in the voltage level of the output of the amplifier 100, and thus adjusting the local oscillator to re-establish the correct phase relationship. Thus, the circuit represents what may be termed a "phase-lock loop" since it locks the system, including the control of the local oscillator, so that the phase difference of the two signals at mixer 90 remains essentially constant. When this condition is achieved, the local receiver oscillator 50A–50E (FIG. 3) is locked in phase with the standard frequency signal received from the ground station.

The operational amplifier 100 operates to establish a controllable DC voltage level on the output control connection 88 to maintain the local oscillator at the desired frequency because it is connected as an integrator amplifier having a capacitor 104 and a resistor 106 connected in series as a feedback from the output connection 88 to the input connection 102. By the nature of the operational amplifier 100, it tends to adjust its output at 88 to provide a negative feedback to prevent any current into its input terminal at 102. Consequently, whenever there is an imbalance in phase causing a change in the output voltage of amplifier 94 which is reflected in a change in the currents through the resistors 96 and 98 and tending to cause a change in voltage above or below ground potential at the input connection 102, the amplifier 100 produces an output current to compensate for this change. This output current changes the charge on the feedback capacitor 104 to provide an opposing current and voltage through resistor 106 to re-establish the zero potential at connection 102. This necessarily results in a change in the voltage level at the output control connection 88 of the amplifier 100. This change in voltage level corrects the frequency of the local oscillator 50A–50E (FIG. 3) to reestablish the desired phase difference as measured by the mixer 90 and the amplifier 94.

When no signal of sufficient amplitude is being received from any ground station there is no output from the amplifier 94, and the output connection 82 is effectively zero volts. The feedback loop of the amplifier 100 including capacitor 104 maintains connection 102 at zero volts. A current is supplied at connection 102 through resistor 98 from the −15 volt terminal. Since the amplifier 100 operates to maintain the input voltage and current at connection 102 at zero value, the current through resistor 98 is supplied entirely through the feedback circuit including the capacitor 104. Thus, the capacitor 104 must be charged up to a continuously increasing higher DC value by current supplied at the output 88 of amplifier 100. This output at connection 88 may be referred to as a scanning voltage, or a ramp voltage, because it causes the local oscillator 50A–50E (FIG. 3) to change in frequency value as the voltage at 88 shifts, in order to search for a ground station signal at the standard frequency which will be detected at connection 81. When the scanning, or ramp, voltage from the connection 88 [acheives] *achieves* the maximum desired value, that condition is detected by an amplifier 108, which energizes a single shot circuit 110, the output of which is amplified by an amplifier 112 which drives a field effect transistor 114 connected across capacitor 104. This discharges the capacitor 104 and causes the voltage at connection 88 to start again *at* substantially zero voltage so that the voltage ramp or [ acan ] *scan* is repeated. This action continues until a ground station signal of sufficient strength is picked up and detected at connection 81, causing the phase lock operation resulting in a voltage at connection 82, as previously described. When that occurs, the zero voltage condition at connection 102 is satisfied by the voltage divider formed by resistors 96 and 98 and the appropriate charge on capacitor 104. Accordingly, the scan operation is interrupted. A diode 116 is connected in parallel with the feedback circuit of amplifier 100 to assure that the potential of connection 88 will not go negative. The diode 116 does not serve any other function and it is normally back-biased and otherwise ineffective in the feedback circuit.

The single shot circuit 110 is simply a monostable multivibrator circuit which is operpable to change state from a first state to a second state whenever a sufficient input voltage is received from amplifier 108. It remains in the second state, providing an output pulse to the amplifier 112, for a predetermined period depending upon the design of the circuit, and then automatically resets to the first state, terminating the pulse. Accordingly, during the continuation of the pulse from the single shot cicruit 110, the field effect transistor 114 discharges the capacitor 104, returning the potential of the control connection 88 to substantially zero. At the end of the pulse from the single shot circuit 110, the scanning voltage ramp operation starts again, with the voltage gradually building up until an input signal is received, or until the capacitor 104 is again discharged by the field effect transistor 114.

As mentioned above, when no ground station signal of sufficient strength is received, there is no phase lock voltage signal at connection 82, the potential of that connection being substantially at zero volts. However, when the phase lock voltage is present at connection 82, that condition is detected by the threshold circuit 84 by turning on the transistor 118 and 120 to provide an output to the gate 72 (FIG. 3).

In the practice of the present invention, two ground station transmitters may be employed at each airport, including a glide slope transmitter which is located near the end of the runway first approached by the aircraft, and a separate localizer transmitter which may be located beyond the far end of the runway (the "roll-out" end) to provide for the localizer function during touchdown and roll-out. These references to transmitter locations are understood to pertain primarily to the locations of the respective transmitting antennas. However, with microwave equipment, the antenna and the rest of the transmitter are generally located together. The localizer transmitter includes means for transmitting the "standard" reference frequency signal along with the localizer navigation signals.

FIG. 5 illustrates a schematic circuit diagram of a localizer transmitter which may be employed at a ground station for carrying out the present invention. A corresponding glide slope transmitter is not separately described since it is substantially similar to the localizer transmitter, except for the omission of the standard reference frequency source. Navigation signals are supplied by the transmitter to an array of eight separate navigation signal antenna elements 122–136. These antenna elements (sometimes referred to below simply as antennas) are schematically positioned to correlate with their separate contributions to a combined signal pattern which is radiated by the combination of antenna element [s] . Thus, the end antenna elements 122 and 136 are effective to set up clearance or cover beam radiations as schematically illustrated by partial beam curves respectively shown at 138 and 152. Similarly, the radiating elements 124 provides a beam of radiation indicated at 140, and each of the other elements 126–134 provides a similar evenly spaced beam, the individual beams being indicated by the [ curbes ] *curves* 142–150. The antennas 122–136, and the associated beams 138–152, are symmetrically arranged on opposite sides of a course plane in space indicated by the dotted line 154. This is the navigational course plane defined by the transmitter. The radio signals radiated from all of the antenna elements 122–136 are at the same carrier frequency. However, the navigation plane 154 is defined by providing different proportions of modulating frequency tones at 90 and 150 Hz in the respective beams on opposite sides of the plane 154. Thus, the 150 Hz modulation predominates in the beams 144, 142, 140, and 138; and the 90 Hz modulation predominates in the beams 146, 148, 150, and 152. The beams 138–152 are sometimes referred to collectively as constituting a switched scanning beam, and the individual beams 138–152 are referred to as providing individual switched portions of the scanning beam.

Since the transmitter illustrated in this drawing is intended for use for a localizer system, the course plane 154 defined by the navigation signals is a vertical plane for guidance of an aircraft in azimuth. Thus, if an aircraft is approaching the transmitter, it receives guidance signals which are balanced when it is in the [ invention ] *navigation* plane 154, and which direct it to turn left or right to achieve a course in the guidance plane 154 if it is not in that plane.

The arrangement of the antennas 122–136 and the beams 138–152 in this drawing are schematic representation only. The actual radiation beams are directed outwardly in a fan configuration, rather than in a parallel beam configuration as illustrated. The separations of the beams 138–152 in the vertical dimension in this drawing are thus representative of angular separations of the beams in the actual radiation pattern. For instance, typical center-to-center angular separations between adjacent beams in the central group of beams 140–150 may be 3.6°. The clearance beams 138 and 152 are of reduced peak energy level, and at wide angles in order to provide a "capture" signal for approaching aircraft and to cover the side lobes of the more central beams. The center line of each of these beams may be at an angle in the order of 24 *degrees* from the guidance plane 154. The antenna elements 122–136 form an array which may employ common antenna structures, such as reflectors, which are not illustrated in the drawing.

The various beams are radiated from the various antenna elements 122–136 by rapidly switching radio frequency energy from one antenna element to another. The energy may come from a single radio frequency source 156. This arrangement is referred to as a switched scanning beam system, and it is carried out in accordance with the basic teachings of a related copending application Ser. No. 104,668 filed Jan. 7, 1971 now Pat. No. 3,774,214 issued Nov. 20, 1973 for a SCANNING BEAM GUIDANCE METHOD AND SYSTEM, and assigned to the same assignee as the present application.

A standard reference frequency signal from a radio frequency source 158 is connected at 160 to radiate from an antenna element 162 a standard reference frequency signal for stabilizing and enhancing the discrimination of the aircraft receiver. This is one of the same reference frequencies referred to above in connection with FIG. 2 and identified at 41A–41E. In accordance with the present invention, the antenna element 162 provides for a wide angle of transmission, encompassing the entire angular field of the navigation signal beams 138–152, and it is preferably a continuous wave signal in contrast to the discontinuous nature of each of the beams 138–152 of the navigation signals. This provides an extremely important advantage in a reference frequency signal which has a one hundred percent duty cycle for the aircraft receiver, and which enhances the operation of the receiver in "locking" onto the reference frequency signal. However, the really important distinction between the nature of the standard reference frequency signal and the navigation signals is that the reference frequency signal is non-scanning. Thus, it provides a [ substanially ] *substantially* uniform radiation over the entire scanning sector. Accordingly, it is possible to employ a reference frequency signal which is discontinuous, or which includes modulation information, without departing from the principles of the present invention. This is acceptable as long as the standard reference frequency signal is not scanned and has a substantially uniform radiation intensity over the entire sector which is not changing in a scanning mode and which does not provide radiation which is different in different portions of the sector. It is also preferred, and contemplated, that the reference frequency signal, if interrupted at all, will have a much higher duty cycle than the navigation signals. Preferably, the reference signal is a continuous, uninterrupted wave having a 100 percent duty cycle.

In accordance with a presently preferred physical embodiment of the invention, the ratio frequency source 156 and the standard frequency source 158 may operate completely independently of one another. However, the difference between the frequencies from these two sources must be maintained at a substantially constant value. This may be done frequently, or constantly, monitoring the frequency difference between the two, or by providing a control connection between the two so that one is controlled by the other. This interrelationship, and possible interconnection, is signified by the dotted line 164. It will be understood that one of these frequency sources may be completely dependent upon, or controlled by, the other one, or that both frequencies may be derived from the frequency of a common source.

In addition to the radio frequency source 156, the transmitter system feeding the antennas 122–136 includes a scanner 166, a pulse modulation source 168 [ controlld ] *controlled* by the scanner, and a modulator gate 170 controlled by the pulse modulation source 168. The transmitter also includes gating devices 172, 174, and 176, by means of which the modulated radio frequency signals are gated to the respective [ antanna ] *antenna* elements 122–136. The switches 172–176 are also controlled by the scanner 166. The control of gate 172 is accomplished through logic OR gates 178 and 180. The modulation provided by the pulse modulation source 168 is preferably a pulse duration modulation in which the modulation is synchronized with the scanning of the beam by the switching of the beam from one antenna element to another. Thus, as the radio frequency is switched to each antenna element 122–136, the duration of the pulse (actually a burst of radio frequency energy) is carefully controlled by gate 170 by the pulse modulation source 168 to [ proide ] *provide* the desired modulation on that particular beam. Since the pattern of modulation to be provided on each of the various beams is constant, there is a complete repetition of the modulation sequence and therefore the different modulation signals required for the different sequences of pulses for each beam can be built into the pulse modulation source. Preferably, the pulse modulation is carried out by means of digital circuits and by means of digital synthesis of the modulation in accordance with the teachings of a prior related patent application Ser. No. 198,839 filed Nov. 15, 1971 by Donald J. Toman for a MODULATION SYNTHESIS METHOD AND APPARATUS and assigned to the same assignee as the present application.

The scanner 166 is operable to issue timing signals in a sequence on the output lines 182 through 196 to control the gating of energy respectively to the antenna elements 122–136, and to control the operation of the pulse modulation source 168 to provide the appropriate modulation in synchronism with the switching of the energy to the respective antenna elements. The scanner provides an output on only one of the output connections 182–196 at any one time. For instance, at the interval when the scanner provides an output at connection 182, that output is received by the pulse modulation source 168, and also by the OR gate 178 and the switch 176. As a result of the signal received by the OR gate 178, an output is provided from that OR gate on connection 198 to the switching device 172, controlling that switching device to cause the radio frequency energy received from the modulation gate 170 to be switched through connection 200 to the four-way gate 176. Concurrently, the scanner signal on connection 182 received by the four-way switch 176 causes the radio frequency energy to be switched to the antenna elements 122. In similar fashion, scanner signals on any one of the outputs 184, 186, and 188 energize the OR gate 178 to switch the radio frequency energy to the switch 176, where that energy is in turn switched respectively to the antenna elements 124, 126, and 128. In a similar fashion, if the scanner output is from connection 190, the OR gate 180, instead of the OR gate 178, is energized, causing an input signal at connection 202 to the switch 172, and causing transmission of the radio frequency energy through connection 204 to the four-way gate 174. At the gate 174, the scanner signal on connection 190 causes delivery of the radio frequency energy to the antenna element 130. By analogy, scanner signals on connections 192, 194, and 196, switch the radio frequency energy respectively to the antenna elements 132, 134, and 136. The switches 172, 174, and 176 may be microwave switches of the type referred to as shunt-diode switches, and may employ PIN diodes.

In accordance with a preferred feature of this invention, the switching of energy in the [ swithced ] *switched* scanning beam, from one antenna element to another is not accomplished in a straight sequence such that the energy is radiated first from antenna element 122, then 124, 126, 128, 130, 132, 134, and 136. Instead, the energy is radiated in a dispersed position sequence, or more briefly as a "dispersed sequence" in which the time sequence does not correspond to the position sequence of the antenna elements. The dispersed sequence preferably operates such that the radiation does not usually occur in two successive switched pulses from two adjacent antenna elements. A more complete description of dispersed sequences, with examples, is given below. The reasons for this preference are as follows: The guidance system operates by the detection by the aircraft receiver of the modulation signals carried by the various angularly positioned beams 138–152, and the relative mixtures of those modulation signals is determined primarily by the strongest beams received at the particular positional beam angle at which the aircraft receives the signals. The aircraft receiver is often positioned at an angle between the peaks of two of the beams such as the beams 142 and 144. At this position, the aircraft will receive relatively high amplitude carrier signals from beams 142 and 144, and much reduced amplitude signals from the other beams such as 140 and 146. If the sequence of scan is such that the bursts of carrier for beams 142 and 144 occur in directly successive time intervals, it may appear to the receiver that the two bursts of carrier are merged into a single longer burst. This causes a loss of the modulation information, especially when the preferred pulse duration modulation is being employed. On the other hand, if a dispersed sequence is used, such that the high amplitude beams 142 and 144 are received in nonsuccessive pulse periods, with an intervening low amplitude beam signal from one of the other beam positions, then there is no loss of modulation information, because the receiver is permitted to recover between high amplitude signals. Another advantage is that the dispersed scan increases the apparent frequency of the signals as received by the receiver, thereby reducing the side bands. Furthermore, by dispersing the high level signals, the receiver is better able to establish an appropriate *control* of the DC level of the combination of signals that are received.

The meaning of the term "dispersed sequence," as it relates to the above description, is more fully defined as follows: The idea is that the sequence involves the selection of successive antenna elements which are in relatively dispersed spacial positions. Thus, the selection of different elements involves a positional skipping around in the selection of sucessive elements, until all of the elements have been selected to accomplish a complete scan. Examples of suitable dispersed sequences, assigning the numbers 1 through 8 respectively to the antenna elements 122–136, are given as follows:

Sequence I: 1 3 5 7 2 4 6 8

Sequence II: 1 4 7 2 5 8 3 6

Sequence III: 1 5 2 6 3 7 4 8

It was stated above that in a dispersed sequence, the radiation does not usually occur in two successive switched pulses from two adjacent antenna elements. Sequence III above accomplishes this by having only one intervening switched pulse between the two switched pulses from two adjacent antenna elements. Thus, in the 1, 5, 2 portion of the sequence, there is only one pulse from antenna element 5 which intervenes between the successive pulse from the adjacent antenna elements 1 and 2. In some instances, it is preferred to disperse the sequence even more than this, assuring that there are two or more intervening pulses between the successive pulse from two adjacent elements. Sequences I and II accomplish this. It is often preferred also to provide a sequence in which there is a skip of more than one beam position for successive pulses. Sequence II accomplishes this. In going from 1 to 4, the positions 2 and 3 are both skipped, and this pattern of skipping at least two positions is continued for each successive pulse period. This arrangement provides [for] *the* advantage that no two successively received pulses will ever be of substantially equal amplitude. That condition can occur with the other sequences listed above if, for instance, the receiver is located at the center line of beam 2. Then a sequence which starts off as 1,3,5...., for instance, will produce equal amplitude signals at 1 and 3 (assuming the 1 beam is radiated at an energy peak equal to the 3 beam). This is avoided with sequence II. Accordingly, sequence II represents what appears to be an optimal sequence for an eight element array. It has been found that it is not always absolutely necessary to provide that no two successive switched pulses are radiated from two adjacent antenna elements in order to achieve a satisfactory dispersed sequence. For instance, a completely random sequence may be employed, and repeated, and if the random sequence is long enough to give a truly random distribution, the [occurance] *occurrence* of two immediately successive switched pulses from two adjacent antenna elements is infrequent enough so as to avoid serious error. Another exception is illustrated in the following sequence:

Sequence IV: 1 3 5 7 8 6 4 2.

In this sequence, 7 and 8 are together, and 2 and 1 are together when the sequence is next repeated. In the system as presently disclosed in connection with FIG. 5, this exception does not [seriosly] *seriously* impair the operation because the beams radiated from antennas 122 and 136 (in the 1 and 8 positions) are the so-called "cover" beams covering wide angles and having lower peak energies than the beams from the other positions.

While this invention has been shown and described in connection with particular preferred embodiments, various alterations and modifications will occur to those skilled in the art. Accordingly, the following claims are intended to define the valid scoppe of this invention over the prior art, and to cover all changes and modifications falling within the true spirit and valid scope of this invention.

I claim:

1. An improved guidance method for a craft to be guided including transmitting radio guidance signals from a ground station comprising a carrier having modulation [patters] *patterns* defining a predetermined guidance path plane for a craft to be guided, transmitting a separate standard frequency signal from the ground station having a predetermined difference in frequency from the guidance signal carrier frequency, and employing the standard frequency to control a local oscillator within a receiver in the craft to be guided to improve the discrimination function of the receiver is discriminating the desired guidance signals from other signals.

2. A method as claimed in claim 1 wherein the standard frequency is employed in the receiver to generate control signals to control the local receiver oscillator to thereby lock the frequency of the oscillator in a fixed frequency relationship to the standard frequency.

3. A method as claimed in claim 2 wherein the frequency lock condition is detected and used to gate guidance signals through the receiver to provide guidance information to the operator of the craft to be guided.

4. A radio guidance method comprising transmitting a pattern of radio carrier signals in a scanning beam with different portions of the scanning beam being positioned on opposite sides of a guidance path plane and carrying modulation to define the guidance path plane for a craft to be guided, transmitting a standard radio frequency signal providing substantially uniform radiation over the entire sector covered by the scanning beam while the scanning beam is being transmitted, the standard frequency signal having a predetermined difference in frequency from the radio carrier frequency of the scanning beam for controlling a receiver local oscillator in the craft to be guided for [ enhacing ] *enhancing* the signal discrimination function.

5. A method as claimed in claim 4 wherein the radio carrier signals are transmitted in a switched scanning beam with different individual and distinct switched portions of the scanning beam carrying unique modulation to define the guidance path plane.

6. A method as claimed in claim 5 wherein the individual switched portions of the scanning beam are modulated by controlling the duration of the pulse of carrier frequency energy radiated for each portion of the scanning beam.

7. A method as claimed in claim 4 wherein the standard frequency signal is transmitted on a higher duty cycle than any one of the different portions of the scanning beam.

8. A method as claimed in claim 7 wherein the standard radio frequency signal is transmitted as a continuous wave.

9. A method for transmitting radio guidance signals comprising transmitting a pattern of signals in a switched scanning beam with individual and distinct switched portions of the scanning beam being positioned on opposite sides of a guidance path plane by switching the radio frequency energy in a dispersed position sequence from one switched portion to another so that the signal from each individual switched portion is intermittent in nature, and modulating the scanning beam with two different modulation signals by providing different ratios of the respective amounts of modulation by said two different modulation signals for said distinct switched portions of the scanning beam with the variation of the modulation ratio being substantially symmetrical about the guidance path plane so that said modulation signals are respectively dominant on opposite sides of the plane and the value of the ratio is one at the plane to thereby define the guidance path plane.

10. A method as claimed in claim 9 wherein the dispersed position sequence is one in which successive switched portions of the scanning beam are always radiated from positions mutually displaced by at least two scanning beam switched portion positions.

11. A method as claimed in claim 9 wherein the dispersed position sequence is one in which successive switched portions of the scanning beam are always radiated from positions mutually displaced by at least three scanning beam switched portion positions.

12. A radio guidance signal transmitter comprising means for transmitting a pattern of radio carrier signals in a scanning beam with different portions of the scanning beam being positioned on opposite sides of a guidance path plane, means for modulating the portions of the scanning beam positioned on opposite sides of the guidance path plane to thereby define the guidance path plane in terms of guidance signals for a craft to be guided, and means for transmitting a standard radio frequency [ 10 ] signal in a substantially uniform pattern of radiation over the entire sector of space covered by the scanning beam, the standard frequency signal having a predetermined difference in frequency from the radio carrier frequency of the scanning beam for controlling the local oscillator of a receiver.

13. A transmitter as claimed in claim 12 wherein said means for transmitting a pattern of radio carrier signals comprises a plurality of antenna elements and switching means for switching radio carrier signals from one antenna element to another to thereby provide individual and distinct switched portions of the scanning beam to form a switched scanning beam, and means for individually modulating the different switched portions of the scanning beam to define the guidance path plane.

14. A transmitter as claimed in claim 13 wherein said modulating means is a pulse modulation means operable in synchronism with the switching of the different portions of the scanning beam to said different antenna elements and operable to control the duration of each period of transmission of energy from each of said antenna elements to thereby provide modulation information in each pulse of carrier energy transmitted from each antenna element.

15. A transmitter as claimed in claim 13 wherein said means for transmitting said standard frequency signal is operable upon a higher duty cycle than any one of the different switched portions of the scanning beam.

16. A transmitter as claimed in claim 15 wherein said means for transmitting said standard frequency signal comprises an antenna element separate from said different antenna elements comprising said means for transmitting said switched portions of said scanning beam, said means for transmitting said standard frequency signal being operable on a continuous basis to transmit a continuous wave signal.

*17. A method for transmitting radio guidance signals comprising*

*transmitting a pattern of signals in a switched scanning beam with individual and distinct switched portions of the scanning beam being arranged in different positions on opposite sides of a guidance path plane by switching the radio frequency energy in a dispersed position sequence from one switched portion to another so that the signal from each individual switched portion comprises intermittent pulses of carrier frequency energy,*

*and modulating the individual switched portions of the scanning beam to define the guidance path plane by controlling the duration of each pulse of carrier frequency energy radiated for each portion of the scanning beam.*

*18. A method as claimed in claim 17 wherein*

*the scanning beam is modulated with two different modulation signals by providing different ratios of the respective amounts of modulation by said two different modulation signals for said distinct switched portions of the scanning beam with the variation of the modulation ratio being such that said modulation signals are respectively dominant on opposite sides of the guidance path plane and the value of the ratio is one at the plane to thereby define the guidance path plane.*

*19. A method as claimed in claim 17 including*

*transmitting a standard radio frequency signal providing substantially uniform radiation over the entire sector covered by the scanning beam while the scanning beam is being transmitted,*

*the standard frequency signal having a predetermined difference in frequency from the radio carrier frequency of the scanning beam for controlling a receiver oscillator in the craft to be guided for enhancing the signal discrimination function.*

* * * * *

UNITED STATES PATENT AND TRADEMARK OFFICE

CERTIFICATE OF CORRECTION

PATENT NO. : Re. 28,762

DATED : April 6, 1976

INVENTOR(S) : Donald J. Toman

It is certified that error appears in the above-identified patent and that said Letters Patent are hereby corrected as shown below:

Column 5, line 48, "is" should read --if--;
line 51, "the" should read --that--.
Column 6, line 49, "opeprates will" should read --operates with--.
Column 7, line 49, "phse" should read --phase--;
line 65, "constant" should read --constants--.
Column 9, line 19, "operpable" should read --operable--;
Column 10, line 3, "element [s]" should read --elements--;
line 7, "elements 124" should read --element 124--;
Column 13, last line, "pulse" should read --pulses--.
Column 14, line 44, "scoppe" should read --scope--.

Above Columns 9 and 10, "Re. 29,762" should read --Re. 28,762--.

Signed and Sealed this

Thirty-first Day of August 1976

[SEAL]

*Attest:*

RUTH C. MASON
*Attesting Officer*

C. MARSHALL DANN
*Commissioner of Patents and Trademarks*